United States Patent
Abe et al.

(10) Patent No.: US 11,458,870 B2
(45) Date of Patent: *Oct. 4, 2022

(54) SEAT WITH AIR VENT

(71) Applicant: TS TECH CO., LTD., Asaka (JP)

(72) Inventors: Ryuzaburo Abe, Tochigi (JP); Sachio Kobayashi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/999,751

(22) Filed: Aug. 21, 2020

(65) Prior Publication Data
US 2020/0376991 A1    Dec. 3, 2020

Related U.S. Application Data

(63) Continuation of application No. 16/150,627, filed on Oct. 3, 2018, now Pat. No. 10,752,140, which is a
(Continued)

(30) Foreign Application Priority Data

Aug. 30, 2013    (JP) .................................. 2013-179238

(51) Int. Cl.
*B60N 2/56*    (2006.01)
*B60N 2/70*    (2006.01)
*B60N 2/58*    (2006.01)

(52) U.S. Cl.
CPC ............. *B60N 2/56* (2013.01); *B60N 2/5621* (2013.01); *B60N 2/5642* (2013.01); *B60N 2/58* (2013.01); *B60N 2/70* (2013.01)

(58) Field of Classification Search
CPC ...... B60N 2/56; B60N 2/5621; B60N 2/5642; B60N 2/58; B60N 2/70
(Continued)

(56) References Cited

U.S. PATENT DOCUMENTS 6,481,801 B1    11/2002    Schmale
6,869,140 B2    3/2005    White et al.
(Continued)

FOREIGN PATENT DOCUMENTS

CN    1937939    3/2007
CN    102745113    10/2012
(Continued)

OTHER PUBLICATIONS

International Search Report issued in PCT/JP2014/072792, dated Sep. 30, 2014, and corresponding English translation.
(Continued)

*Primary Examiner* — Rodney B White
(74) *Attorney, Agent, or Firm* — Hamre, Schumann, Mueller & Larson, P.C.

(57) ABSTRACT

It is an object to provide a seat of which a seating comfort can be improved. The seat includes a seat cushion pad having an air passage formed inside and an air vent formed at an upper surface thereof, and is configured to allow air in the air passage to blow out through the air vent, wherein the seat cushion pad includes a pad body and a cover member which is disposed over the pad body to form the air passage between the pad body and the cover member and in which the air vent is formed, and a front end portion of the cover member extends downward over a front end portion of the pad body.

11 Claims, 13 Drawing Sheets

Related U.S. Application Data continuation of application No. 15/618,942, filed on Jun. 9, 2017, now Pat. No. 10,124,705, which is a continuation of application No. 14/914,546, filed as application No. PCT/JP2014/072792 on Aug. 29, 2014, now Pat. No. 9,707,875.

(58) Field of Classification Search
USPC ............. 297/180.13, 180.14, 452.42, 452.41
See application file for complete search history.

(56) References Cited

U.S. PATENT DOCUMENTS

| | | | |
|---|---|---|---|
| 7,287,812 B2 | 10/2007 | Ishima et al. | |
| 7,857,395 B2 | 12/2010 | Kikuchi et al. | |
| 7,931,330 B2 | 4/2011 | Itou et al. | |
| 9,707,875 B2 | 7/2017 | Abe et al. | |
| 10,124,705 B2 | 11/2018 | Abe et al. | |
| 10,752,140 B2 * | 8/2020 | Abe | B60N 2/70 |
| 2004/0139758 A1 | 7/2004 | Kamiya et al. | |
| 2005/0200166 A1 | 9/2005 | Noh | |
| 2005/0280294 A1 | 12/2005 | Ishima et al. | |
| 2007/0176471 A1 | 8/2007 | Knoll | |
| 2009/0079236 A1 | 3/2009 | Itou et al. | |
| 2009/0152909 A1 | 6/2009 | Andersson | |
| 2009/0243365 A1 | 10/2009 | Lein et al. | |
| 2010/0045079 A1 | 2/2010 | Andersson et al. | |
| 2011/0059667 A1 | 3/2011 | Meyer et al. | |
| 2012/0261974 A1 | 10/2012 | Yoshizawa et al. | |
| 2012/0267937 A1 | 10/2012 | Sahashi | |
| 2013/0097777 A1 | 4/2013 | Marquette et al. | |
| 2015/0210193 A1 | 7/2015 | Kurosawa et al. | |
| 2015/0274047 A1 | 10/2015 | Ise et al. | |
| 2015/0329028 A1 | 11/2015 | Ogino et al. | |
| 2016/0157617 A1 | 6/2016 | Galbreath et al. | |
| 2016/0332549 A1 | 11/2016 | Marquette et al. | |

FOREIGN PATENT DOCUMENTS

| | | |
|---|---|---|
| DE | 10037065 | 2/2002 |
| DE | 20308535 | 8/2003 |
| EP | 2072328 | 6/2009 |
| JP | 2004-166812 | 6/2004 |
| JP | 2004-215810 | 8/2004 |
| JP | 2005-95342 | 4/2005 |
| JP | 2006-102329 | 4/2006 |
| JP | 2008-125829 | 6/2008 |
| JP | 2009077760 | 4/2009 |
| JP | 2012-224234 | 11/2012 |

OTHER PUBLICATIONS

Office Action issued for corresponding Japanese Patent Application No. 2013-179241, dated Mar. 14, 2017, 6 pages including English translation.
Office Action issued for corresponding Chinese Patent Application No. 201480047696.1, dated Apr. 20, 2017, 14 pages including English translation.
Office Action issued for Chinese Patent Application No. 201480047696.1, dated Mar. 21, 2018, 7 pages including English translation.
Office Action issued for Chinese Patent Application No. 201480047696.1, dated Nov. 19, 2018, 17 pages ncluding English translation.
Office Action issued for Japanese Patent Application No. 2018-089008, dated Feb. 5, 2019, 9 pages including English translation.
Office Action issued for Chinese Patent Application No. 201910678574.7, dated May 6, 2021, 12 pages including English translation.
Second Office Action issued for Chinese Patent Application No. 201910678574.7, dated Feb. 23, 2022, 15 pages including English translation.

* cited by examiner

SEAT WITH AIR VENT

TECHNICAL FIELD

The present invention relates to a seat configured to have a capability of producing a stream of air forced out from a seat cushion.

BACKGROUND ART

A seat having an air-conditioning capability is hitherto known in the art wherein air can be caused to blow from its seat cushion against an occupant seated thereon. For example, Patent Document 1 discloses a vehicle seat configured to comprise a seat cushion pad divided in two, upper and lower pads, of which the upper pad having an air vent for letting air out is stacked over the lower pad whereby an air passage for introducing air from a blower is formed between the upper and lower pads.

CITATION LIST

Patent Literature

Patent Document 1: JP 2004-215810 A

SUMMARY OF INVENTION

Such a conventional configuration allows deformation in the pads to be caused when a person sits down on the seat cushion, and would possibly cause the front end portion of the upper pad to be lifted, making some unevenness at and around the border between the front end portions of the upper and lower pads. This unevenness, which may touch the legs and the like, would be detrimental to seating comfort.

Against this backdrop, the present invention has been made, and an object pursued herein. is to provide a seat in which the seating comfort can be improved.

Moreover, in the present invention, another object expected to be achieved is to minimize an undesirable shift of a cover member relative to a pad body.

Furthermore, in the present invention, yet another object expected to be achieved is to retain a sufficient cross-sectional area of the air passage.

The present invention proposed in an attempt to achieve any of the aforementioned objects provides a seat comprising a seat cushion pad having an air passage formed inside and an air vent formed at an upper surface thereof, the seat being configured to allow air in the air passage to blow out through the air vent, the seat cushion pad including a pad body and a cover member, the cover member being disposed over the pad body to form the air passage between the pad body and the cover member, the air vent being formed in the cover member, wherein the cover member includes a front end portion extending downward over a front end portion of the pad body.

With this configuration, even if the front end portion of the cover member is lifted when an occupant sits on the seat, no unevenness is made at the front end portion of the seat cushion pad, and thus the seating comfort can be improved.

The seat as described above may be configured such that one of an upper surface of the pad body and a lower surface of the cover member has a protrusion formed thereon, and the other of the upper surface of the pad body and the lower surface of the cover member has a locating depression formed therein to be fitted on the protrusion.

With this feature, an undesirable shift of the cover member relative to the pad body can be reduced.

The above-described seat may be configured such that the protrusion is formed on the upper surface of the pad body and the locating depression is formed in the lower surface of the cover member, wherein lateral widths of the protrusion and the depression are greater on front sides thereof than on rear sides thereof.

With this configuration, an undesirable frontward shift of the cover member relative to the pad body can be effectively reduced.

Alternatively, the above-described seat may be configured such that the protrusion is formed on the lower surface of the cover member and the locating depression is formed in the upper surface of the pad body, wherein lateral widths of the protrusion and the locating depression are greater on rear sides thereof than on front sides thereof.

With this configuration as well, the undesirable frontward shift of the cover member relative to the pad body can be effectively reduced.

The above-described seat may he configured such that the protrusion and the locating depression are formed at a laterally central portion of a front region of the seat cushion pad. With this configuration, the portion at which the protrusion and the depression are formed is rendered unlikely to receive a load from right above, and thus excessive deformation in the protrusion and the locating depression can be suppressed. This makes it possible to keep the engagement of the protrusion with the locating depression in a good state, thus serving to more effectively reduce the undesirable shift of the cover member relative to the pad body.

The above-described seat may be configured such that the pad body and the cover member have air-passage depressions respectively that are opposite to each other to form the air passage.

With this configuration, it is ensured that the air passage can be formed which has a sufficiently large cross-sectional area, more reliably in comparison with an alternative configuration in which no air-passage depression is formed in one of the pad body and the cover member.

In the above-described seat, the pad body may have an upper surface in which a depression is formed, and the cover member may include a cover body and an extensional marginal portion, the cover body being engageable with the depression to form the air passage between the cover body and the pad body, the extensional marginal portion extending from at least one side of a periphery of the cover body horizontally outward beyond an edge of the depression.

With this configuration, even when a gap is formed between the cover member and the pad body, this gap can be sealed due to the contact of the extensional marginal portion with the pad body, so that an air leakage from the air passage can he reduced. Moreover, the contact area of the pad body and the cover member can be made larger, and thus the gap between the pad body and the cover member becomes unlikely to be formed; this also serves to reduce an air leakage from the air passage.

The above-described seat may be configured to further comprise an outer covering material with which the seat cushion pad is covered, wherein the pad body includes an outer covering attachment member provided horizontally outward of the depression, such that an engageable portion provided in the outer covering material is engageable with the outer covering attachment member, and wherein the extensional marginal portion is configured to extend near the outer covering attachment member so as to form part of an opening for allowing the engageable portion to be engaged with the outer covering attachment member.

With this configuration, the extensional marginal portion can be held relatively firmly by the outer covering material attached to the outer covering attachment member. Thus, the gap between the pad body and the cover member becomes unlikely to be formed; this also serves to reduce an air leakage from the air passage.

The above-described seat may be configured such that the extensional marginal portion is configured to extend from left and right sides of the periphery of the cover body.

With this configuration, even if the left and right extensional marginal portions are lifted or otherwise deformed when an occupant sits on the seat, such occurs in a position remote from the occupant, and thus the potential deterioration of the seating comfort can be suppressed.

The above-described seat may be configured such that the pad body includes a bulging portion provided at each of left and right sides of the cover member, the bulging portion bulging upward beyond the cover member, wherein the extensional marginal portion is configured to extend up to a position adjacent to the bulging portion.

With this configuration, even if the left and right extensional marginal portions are lifted or otherwise deformed when an occupant sits on the seat, such will not cause the occupant discomfort, and thus the seating comfort can be improved.

In the above-described seat, the extensional marginal portion may be configured to extend from a front side of the periphery of the cover body up to or farther beyond the front end portion of the pad body.

With this configuration, no unevenness will result at the front portion of the upper surface of the seat cushion pad when an occupant sits on the seat because the border between the front-side extensional marginal portion and the pad body is not present on the upper surface of the seat cushion pad. Therefore, the potential deterioration. of the seating comfort can be suppressed.

The above-described seat may be configured such that the pad body and the cover member have air-passage depressions respectively that are opposite to each other to form the air passage.

With this configuration, it is ensured that the air passage can be formed which has a sufficiently large cross-sectional area, more reliably in comparison with an alternative configuration in which no air-passage depression is formed in one of the pad body and the cover member.

The above-described seat may be configured such that the pad body includes a first body portion and a second body portion, wherein the second body portion is provided between the first body portion and the cover member, and is laid over an upper surface of the first body portion, and has a front end portion extending downward.

With this configuration, where the pad body has two-part construction comprising the first body portion and the second body portion, as well, even if the front end portion of the second body portion is lifted when an occupant sits on the seat, no unevenness is made in the front portion of the upper surface of the seat cushion pad, and thus the seating comfort can be improved.

The above-described seat may be configured such that the first body portion includes a front end portion that includes a stepped portion that is lower in level on a front side thereof, wherein at least one of the front end portion of the second body portion and a front end portion of the cover member is in contact with an upward-facing surface that is disposed frontward of the stepped portion of the first body portion.

With this configuration, an undesirable downward shift of the second body portion or the cover member can be effectively reduced.

DESCRIPTION OF EMBODIMENTS

Hereafter, one embodiment of the present invention will be described in detail with reference made to the drawings where appropriate.

Figure 1:
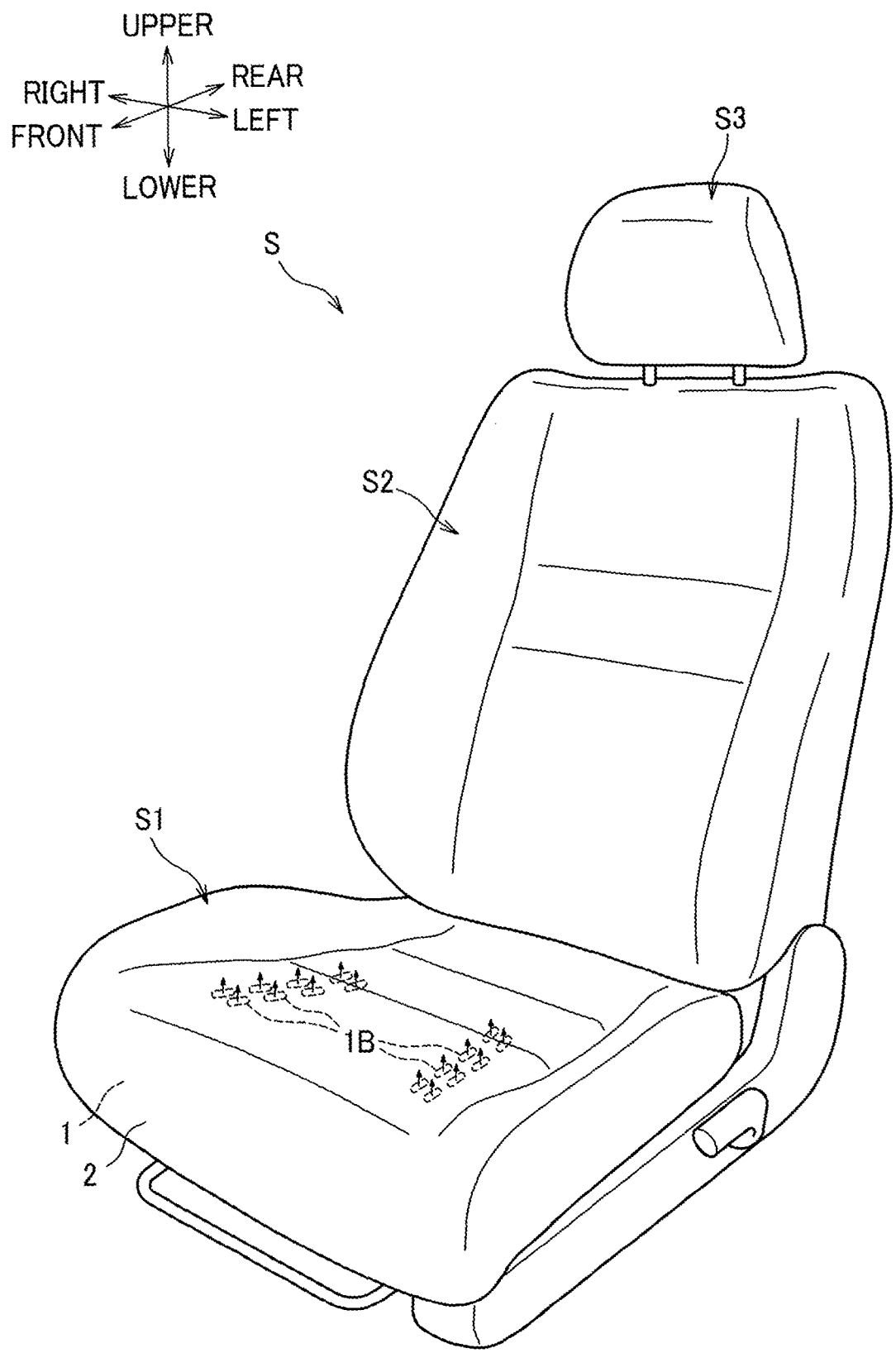
FIG. 1 is a perspective view of a car seat as an example of a seat according to a practicable embodiment.

As shown in FIG. 1, a seat according to the present embodiment is configured as a car seat S for use in a driver's seat or a passenger seat of an automobile, or the like, and mainly includes a seat cushion S1 allowing an occupant to be seated thereon, a seat back S2 configured to support an upper body of the occupant, and a headrest S3 allowing the head of the occupant to be supported thereon.

The seat cushion S1 mainly includes a metal frame (not shown), a seat cushion pad 1 made of a cushiony material such as urethane foam, and an outer covering material 2 made of synthetic leather, fabric or the like, wherein the seat cushion pad 1 is put over the frame and then upholstered with the outer covering material 2 put over the seat cushion pad 1.

The seat cushion pad 1, of which a detailed configuration will be described later, though, includes an air passage 1A formed inside (see FIG. 5) and a plurality of air vents 1B formed at an upper surface thereof; and is configured to allow air supplied into the air passage 1A from a blower or the like (not shown) to blow out through the air vents 1B against the occupant as indicated by arrows in FIG. 1. Although not illustrated, in eases where the outer covering material 2 is made of less-breathable material, openings for allowing air to pass therethrough are formed in those positions of the outer covering material 2 which correspond to the positions of the air vents 1B.

Figure 2:
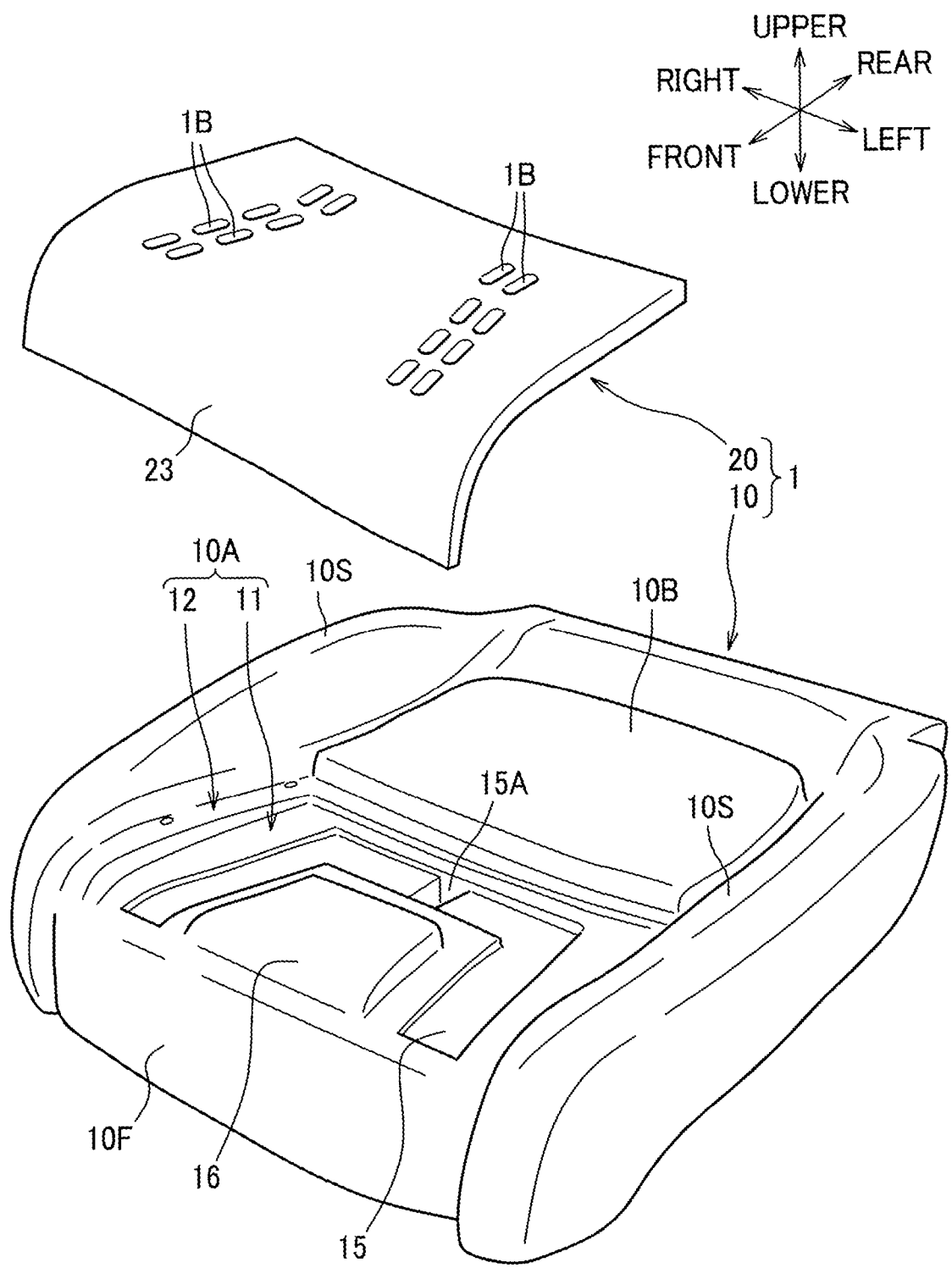
FIG. 2 is an exploded perspective view of a seat cushion pad.

As shown in FIG. 2, the seat cushion pad 1 mainly includes a pad body 10 with which the frame of the seat cushion S1 is covered, and a cover member 20 having an upper surface in which the plurality of air vents 1B are formed. It is to be understood that the materials for the pad body 10 and the cover member 20 may be the same or different from each other.

Figure 3:
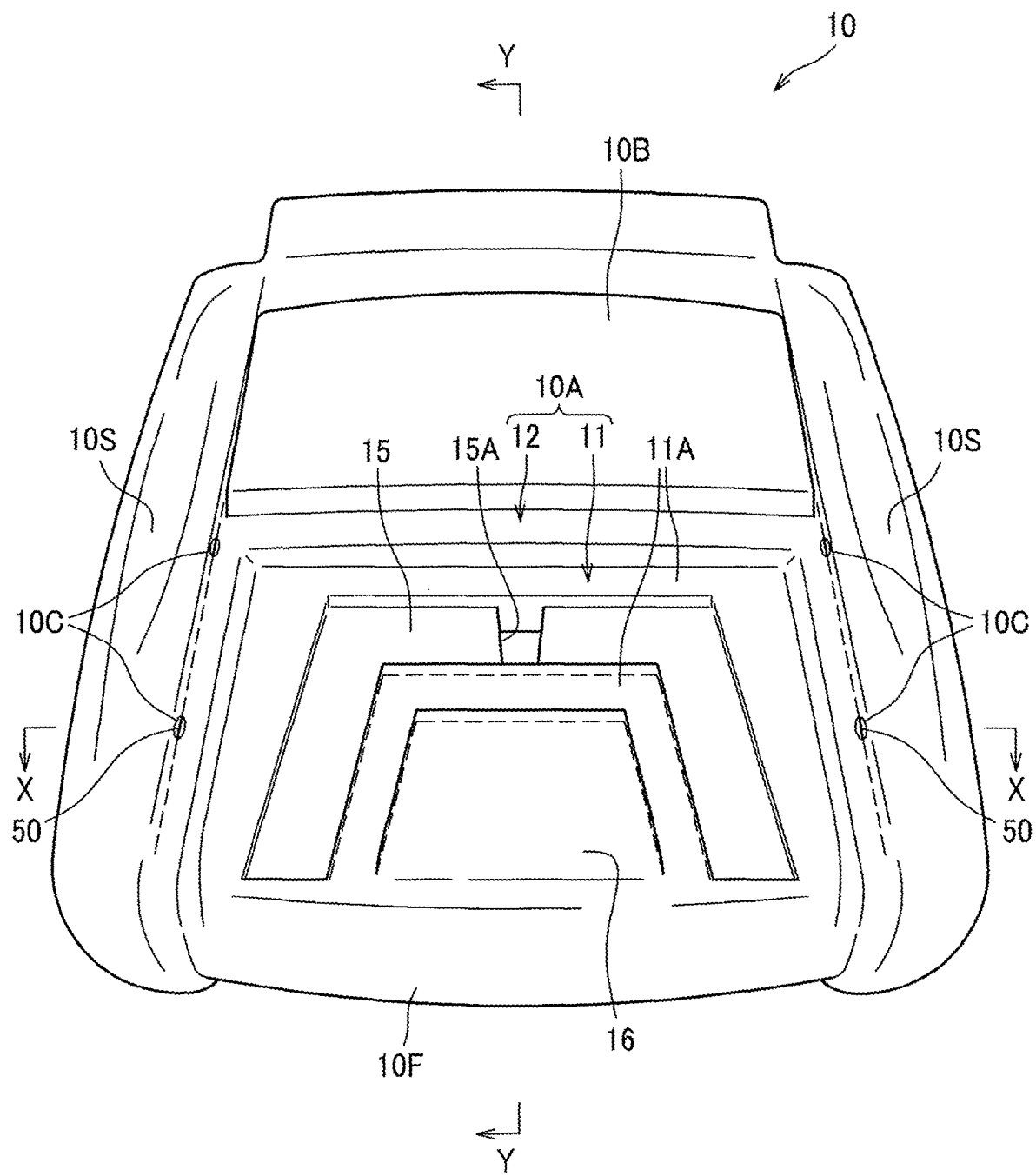
FIG. 3 is a perspective view of a pad body.

In a front region of a laterally central portion of the upper surface of the pad body 10, an engageable depression 10A is formed which is configured to have a shape recessed down with respect to a laterally central rear portion 10B (that is a rear region of the laterally central portion) such that the cover member 20 is engageable with the engageable depression 10A. As shown in FIG. 3, the engageable depression 10A comprises a first depression 11 as an example of a depression, and a second depression 12 which is recessed but down to a level that is one step higher than that of a bottom 11A of the first depression 11 and formed around the first depression 11. Dominant structures formed in the first depression 11 include a body-side air-passage depression 15 recessed deeper than the bottom 11A and a locating protrusion 16 (as a protrusion in the context of the present invention) protruding upward from the bottom 11A.

The body-side air-passage depression 15 is a groove that is disposed opposite a cover-side side air-passage depression 25 (see FIG. 5) of the cover member 20, which will be described later, to define the air passage IA, and is formed to have a substantially U shape as in a plan view. A through hole 15A piercing through the pad body 10 in the upward-downward direction is formed at or around the laterally central position of this body-side air-passage depression 15. The through hole 15A is a hole for allowing air to be introduced into the air passage 1A.

The locating protrusion 16 is provided at or around a laterally central portion of a front region of the bottom 11A. This locating protrusion 16 is formed to have a substantially trapezoidal shape (in a plan view) with side surfaces tapered such that the lateral width of the locating protrusion 16 increases to be greater on its front side than on its rear side.

Figure 5:
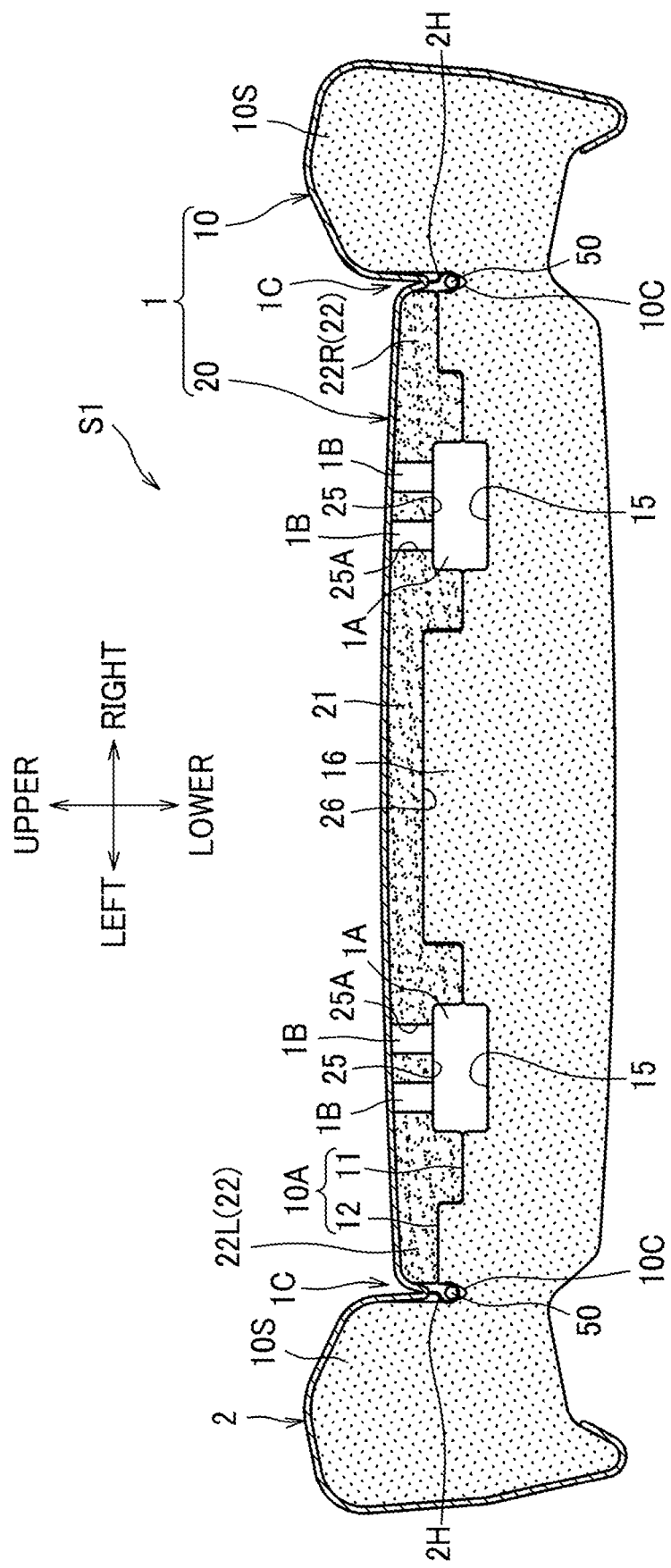
FIG. 5 is a sectional view of a seat cushion as corresponding to the section X-X shown in FIG. 3.

As shown in FIGS. 3 and 5, the pad body 10 includes a bulging portion 10S provided at each of left and right sides of the engageable depression 10A (cover member 20) and the central rear portion 10B which bulging portion 1.0S is configured to bulge upward beyond the upper surfaces of the cover member 20 and the central rear portion 10B. An outer covering attachment wire 50 as an example of an outer covering attachment member with which an engageable portion 2H shaped like a hook provided in the outer covering material 2 is engageable is provided at each of the left and right end portions of the pad body 10. To be more specific, the outer covering attachment wire 50 is disposed to extend in the front-rear direction and embedded within the pad body 10 in a position horizontally (laterally) outward of the first depression 11 at or near the border between the bulging portion 10S and the engageable depression 10A. This outer covering attachment wire 50 is partially exposed through a hole 10C provided in the pad body 10, and the engageable portion 2H of the outer covering material 2 is engaged with this exposed portion, so that the outer covering material 2 is fastened to the pad body 10 (the seat cushion pad 1).

Figure 4:
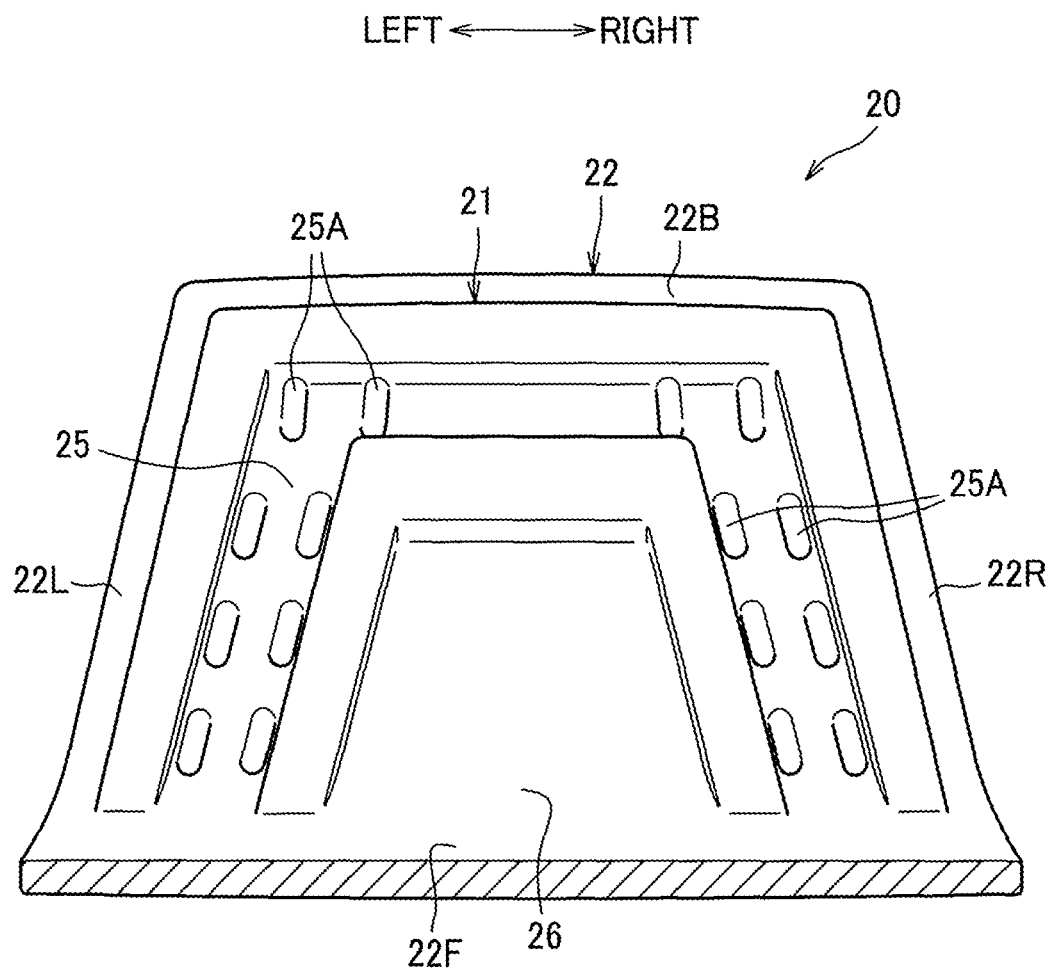
FIG. 4 is a cutaway perspective view of a cover member as seen from below.
Figure 6:
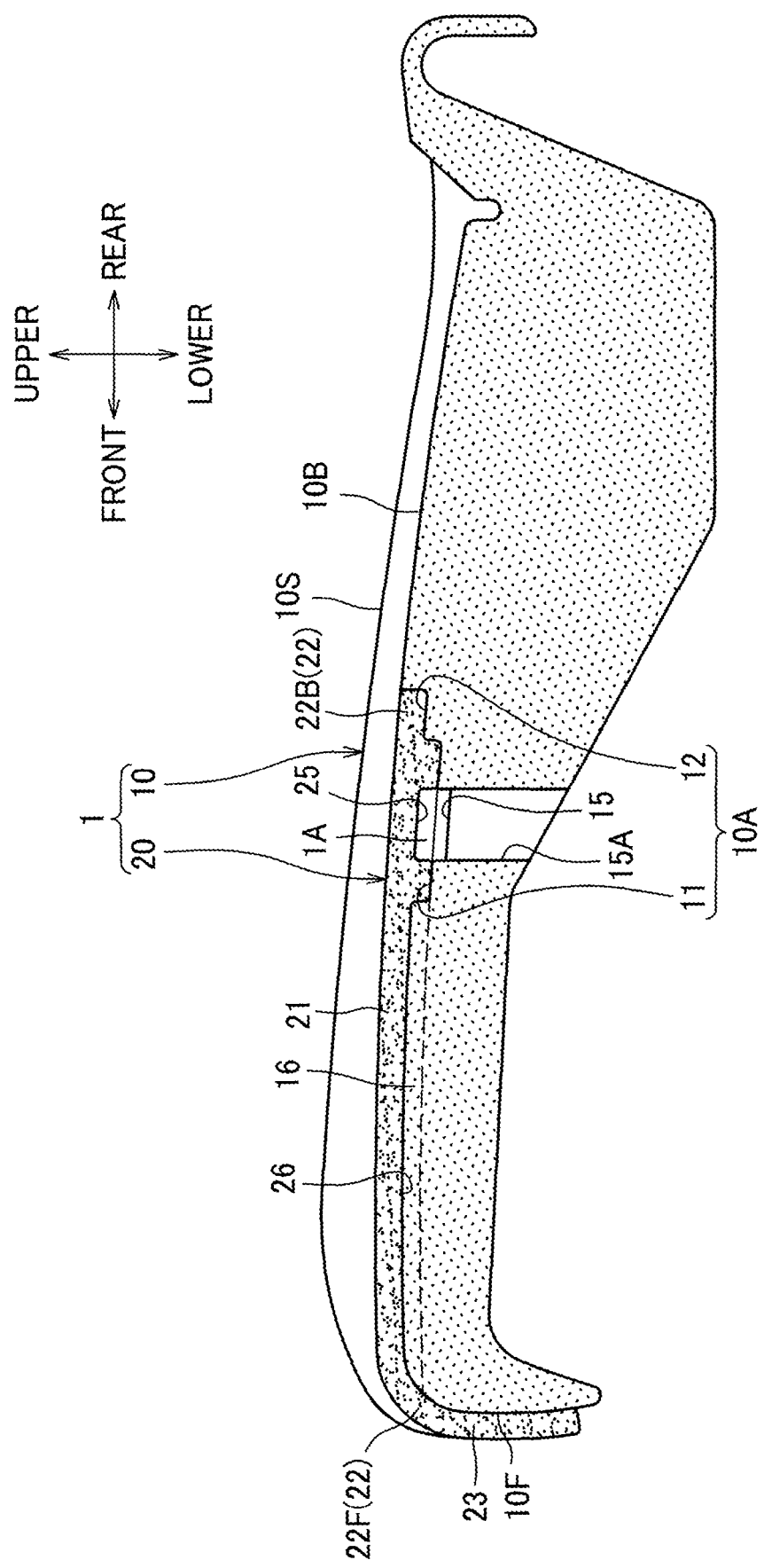
FIG. 6 is a sectional view of a seat cushion pad as corresponding to the section Y-Y shown in FIG. 3.

As shown in FIGS. 4 and 5, the cover member 20 is a member that is not adhered to but engaged with the engageable depression 10A of the pad body 10, and thus disposed on the pad body 10 so that the air passage 1A is formed between the cover member 20 and the pad body 10; the cover member 20 mainly includes a cover body 21, an extensional marginal portion 22, and a front end portion 23 (see FIG. 6). As shown in FIG. 6, an upper surface of the cover member 20 engaged with the engageable depression 10A is substantially flush with an upper surface of the central rear portion 10B of the pad body 10. In FIG. 4, which is a perspective view of the cover member 20 as viewed from below, the cover member 20 is shown as a cutaway in which the front end portion 23 is removed for convenience of clear illustration of a cover-side air-passage depression 25 and a locating depression 26 which will be described later.

As shown in FIGS. 4 and 5, the cover body 21 has a lower portion mainly engaged with the first depression 11 of the pad body 10 to form the air passage 1.A between the cover body 21 and the pad body 10. A lower surface of the cover body 21 is provided with the cover-side air-passage depression 25 and the locating depression 26.

The cover-side air-passage depression 25 is a groove that is disposed opposite the body-side air-passage depression 15 when the cover member 20 is engaged with the engageable depression 10A of the pad body 10, to define the air passage 1A, and is so formed as to have a substantially U shape in a plan view similar to the shape of the body-side air-passage depression 15. At a bottom of the cover-side air-passage depression 25, a plurality of communication holes 25A are formed by means of which the cover-side air-passage depression 25 communicates with the air vents 1B. Air introduced into the air passage 1A passes through the communication holes 25A and let out through the air vents 1B.

The locating depression 26 is a depression with which a locating protrusion 16 of the pad body 10 is engageable, and is disposed at or around a laterally central portion of a front region of the lower surface of the cover body 21. This locating depression 26 is formed to have a substantially trapezoidal shape (in a plan view), similar to the shape of the locating protrusion 16, such that the lateral width of the locating depression 26 is greater on a front side thereof than on a rear side thereof.

As shown in FIG. 4, the extensional marginal portion 22 is a portion extending protrusively from an upper portion of each side of a periphery of the cover body 21 horizontally outward beyond an edge of the first depression 11 (outward in the front and rear directions as well as in the left and right directions). This extensional marginal portion 22 includes a left-side marginal portion 22L and a right-side marginal portion 22R which extend from left and right sides, respectively, of the periphery of the cover body 21, a front-side marginal portion 22F which extends from a front side of the periphery of the cover body 21, and a rear-side marginal portion 22B which extends from a rear side of the periphery of the cover body 21, wherein the front-side marginal portion 22F, the left-side marginal portion 22L, the rear-side marginal portion 22B and the right-side marginal portion 22R are so formed continuously in a substantially flange-like shape as to surround the cover member 21. When the cover member 20 is engaged with the engageable depression 10A of the pad body 10, the extensional marginal portion 22 is placed within the second depression 12 of the pad body 10.

As shown in FIG. 5, the left-side marginal portion 22L and the right-side marginal portion 22R are configured to extend up to positions adjacent to the bulging portions 10S of the pad body 10, respectively. To be more specific, the left-side marginal portion 22L, and the right-side marginal portion 22R are each configured to extend up to a position near the outer covering attachment wire 50, and its end face forms a part of a wall of a tuck-in groove 1C as an example of an opening for allowing the outer covering material 2 to be tucked therein between the end face and the pad body 10 or allowing the engageable portion 2H of the outer covering material 2 to be engaged on the outer covering attachment wire 50. Moreover, as shown in FIG. 6, the front-side marginal portion 22F is configured to extend frontwardly beyond the front end portion 10F of the pad body 10.

The front end portion 23 is a portion extending continuously from the front-side marginal portion 22F downward along the front end portion 10F of the pad body 10. In other words, the front end portion 23 extends downward to cover the front end portion 10F of the pad body 10 from the front side.

Next, operations and advantageous effects of the car seat S configured as described above will be discussed.

Figure 7:
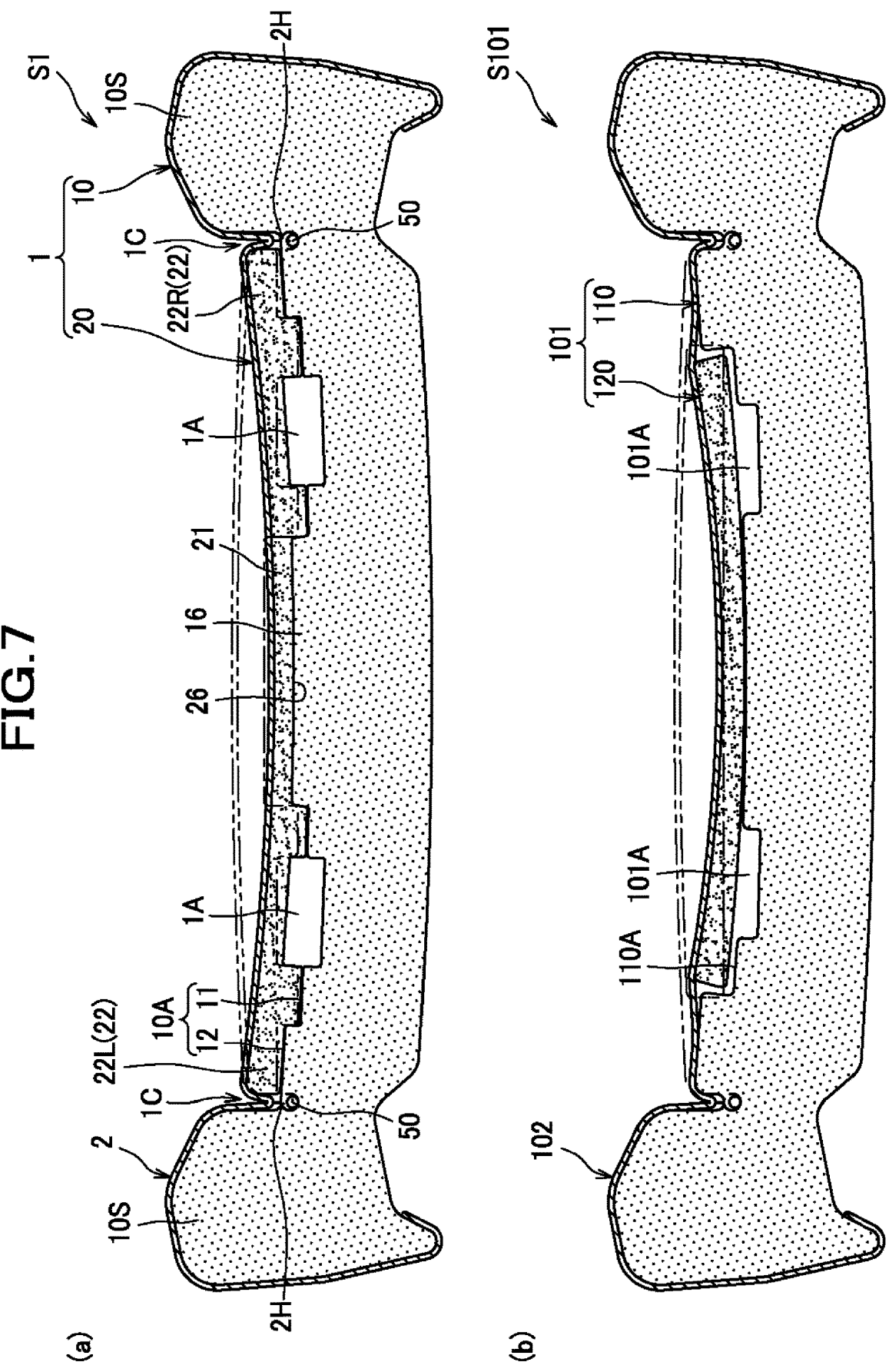
FIG. 7 includes a diagram (a) illustrating an operation and an advantageous effect of an extensional marginal portion of the car seat according to the practicable embodiment, and a diagram (b) illustrating a comparative example.

A comparative example illustrated in FIG. 7(b) as a reference shows a seat cushion S101 configured such that a seat cushion pad 101 is covered with an outer covering material 102. The seat cushion pad 101 of the seat cushion S101 includes a pad body 110 and a cover member 120 shaped like a plate and fitted in a depression 110A formed in an upper surface of the pad body 110. An air passage 101A is formed between the pad body 110 and the cover member 120.

In the comparative example of FIG. 7(b), when an occupant sits on the seat cushion S101, the laterally central portion of the cover member 120 subsides and the cover member 120 deforms into a bowlike shape as viewed from the front side, with the result that its peripheral portion tends to lift from the pad body 110. Accordingly, some unevenness may be made between the end portion of the cover member 120 and the pad body 110, and if such unevenness happens to touch the occupant through the outer covering material 102, the seating comfort will be impaired. Furthermore, a gap may be made between the end portion of the cover member 120 and the pad body 110, and air in the air passage 101A would possibly leak from this gap.

On the other hand, in the present embodiment as illustrated in FIGS. 6 and 7(a), in which the cover member 20 includes the extensional marginal portion 22 extending from the periphery of the cover body 21, even if any gap would be made between the end portion of the cover body 21 and the pad body 10, contact established between the extensional marginal portion 22 and the pad body 10 can seal the gap, and thus can reduce the possibility of leakage of air from the air passage 1A. Moreover, provision of the extensional marginal portion 22 extending from the periphery of the cover member 21 makes it possible to increase a contact area between the pad body 10 and the cover member 20, and thus makes such a gap unlikely to be made between the pad body 10 and the cover member 20; in this respect, as well, the possibility of leakage of air from the air passage 1A can be minimized.

Of the extensional marginal portion 22, each of the left-side marginal portion 22L and the right-side marginal portion extends up to a position near the outer covering attachment wire 50 and constitutes a part of the tuck-in groove 1C for allowing the outer covering material 2 to be engaged therewith, and is thus held relatively firmly by the outer covering material 2 attached to the outer covering attachment wire 50. This makes any gap more unlikely to be made between the pad body 10 and the cover member 20, and can further reduce the possibility of leakage of air from the air passage 1A.

In view of the seating comfort, the front-side marginal portion 22F of the extensional marginal portion 22 is configured as shown in FIG. 6 to extend up to the front end portion 10F of the pad body 10; thus, the border between the front-side marginal portion 22F and the pad body 10 does not exist on the upper surface of the seat cushion pad 1. Accordingly, even if the front-side marginal portion 22F is lifted when an occupant sits on the seat, no unevenness is produced on the front region of the upper surface of the seat cushion pad 1, and thus the potential deterioration of the seating comfort can be suppressed.

According to the present embodiment, the front end portion 23 of the cover member 20 is configured to extend downward so as to cover the front end portion 10F of the pad body 10, so that no unevenness is made in the front end portion of the seat cushion pad 1. Thus, the seating comfort can be improved.

Furthermore, since the left-side marginal portion 22L and the right-side marginal portion 22R of the extensional marginal portion 22 are configured, as shown in FIG. 7(a), to extend from the left and right sides of the periphery of the cover body 21 away from the occupant, even if the left-side marginal portion 22L and the right-side marginal portion 22R are lifted when an occupant sits on the seat, such a lift would occur in positions remote from the occupant, so that the potential deterioration of the seating comfort can be suppressed.

More specifically, the left-side marginal portion 22L and the right-side marginal portion 22R are configured to extend up to the positions adjacent to the bulging portions 10S of the pad body 10, and thus even if the left-side marginal portion 22L and the right-side marginal portion 22R are lifted when an occupant sits on the seat, such will not cause the occupant discomfort. Therefore, the seating comfort can be improved. Moreover, as described above, the left-side marginal portion 22L and the right-side marginal portion 22R are configured to be held relatively S firmly by the outer covering material 2, and thus are unlikely to be lifted in the first place; thus the seating comfort can be improved more.

In the comparative example shown in FIG. 7(b), when an occupant sits on the seat, the laterally central portion of the cover member 120 subsides and the peripheral portions are pulled toward the center, and thus a gap may be likely to be made between the end face of the cover member 120 and the pad body 110. Therefore, the end portion of the cover member 120 tends to lift, with the result that unevenness will be made or a gap will be made. On the other hand, in the present embodiment shown in FIG. 7(a), the portions where the locating protrusion 16 and the locating depression 26 are formed, in particular, the both of the left and right sides of those portions arc configured such that no gap is likely to be made between the end face of the cover is body 21 and the pad body 10. This is because even if the laterally central portion of the cover member 20 subsides and pulls the peripheral portion toward the center, the abutment of the side faces of the locating depression 26 with the side faces of the locating projection 16 serves to render the outer portions (outside the locating depression 26) of the peripheral portion of the cover member 20 unlikely to be pulled toward the center. This reduces the possibility of lifting of the end portions of the cover member 20, and thus makes it possible to improve the seating comfort and makes it difficult to make a gap between the end portion of the cover member 20 and the pad body 10, so that the possibility of leakage of air from the air passage 1A can be reduced more effectively.

Also, in the present embodiment, since the locating protrusion 16 formed on the upper surface of the pad body 10 is fitted in the locating depression 26 formed on the lower surface of the cover member 20, any undesirable shift of the cover member 20 from the pad body 10 can be suppressed even in cases where the pad body 10 and the cover member 20 are not bonded to each other by adhesive or the like.

Figure 8:
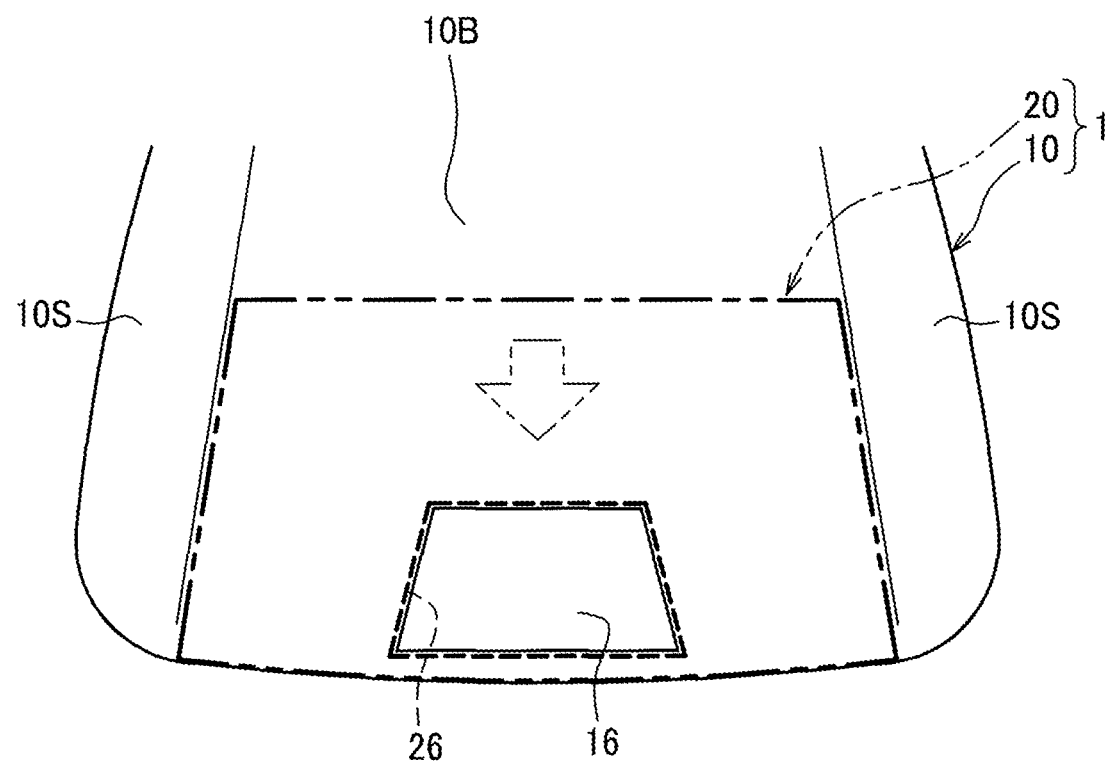
FIG. 8 is diagram illustrating an operation and an advantageous effect of a locating protrusion and a locating depression of the car seat according to the practicable embodiment.

Particularly, in the present embodiment, since the locating protrusion 16 and the locating depression 26 are each formed to have a substantially trapezoidal shape (in a plan view) such that the lateral widths thereof are greater on front sides thereof than on rear sides thereof as shown in FIG. 8, the left and right side surfaces "engage" when the locating protrusion 16 is fitted in the locating depression 26, so that an undesirable frontward shift of the cover member 20, in particular, relative to the pad body 10 can be suppressed effectively.

In the present embodiment, since the locating protrusion 16 and the locating depression 26 are each disposed in a laterally central portion of the front region of the seat cushion pad 1, in other words, formed on or near the position corresponding to the position between the left and right thighs of an occupant, the portions in which the locating protrusion 16 and the locating depression 26 are formed are rendered unlikely to receive a load directly from above. Therefore, any large deformation of the locating protrusion 16 and the locating depression 26 can be suppressed, so that a good state of engagement of the locating protrusion 16 and the locating depression 26 can be maintained and the undesirable shift of the cover member 20 relative to the pad body 10 can be suppressed more effectively.

As shown in FIG. 5, in the present embodiment, the both of the pad body 10 and the cover member 20 have the air-passage depressions 15, 25 for defining the air passage 1A; therefore, it is ensured that the air passage 1A having a sufficiently large cross-sectional area can be formed more reliably in comparison with an alternative configuration in which the air-passage depression is formed only in either one. Accordingly, a sufficient space for allowing air to pass therethrough can be made within the seat cushion pad 1 which deforms due to an occupant sitting on the seat.

The embodiment of the present invention has been described above, but it is to be understood that the present invention is not limited to the illustrated embodiment. In specific constructions, modifications may be made where appropriate without departing from the gist of the present invention as will be described below.

Figure 9:
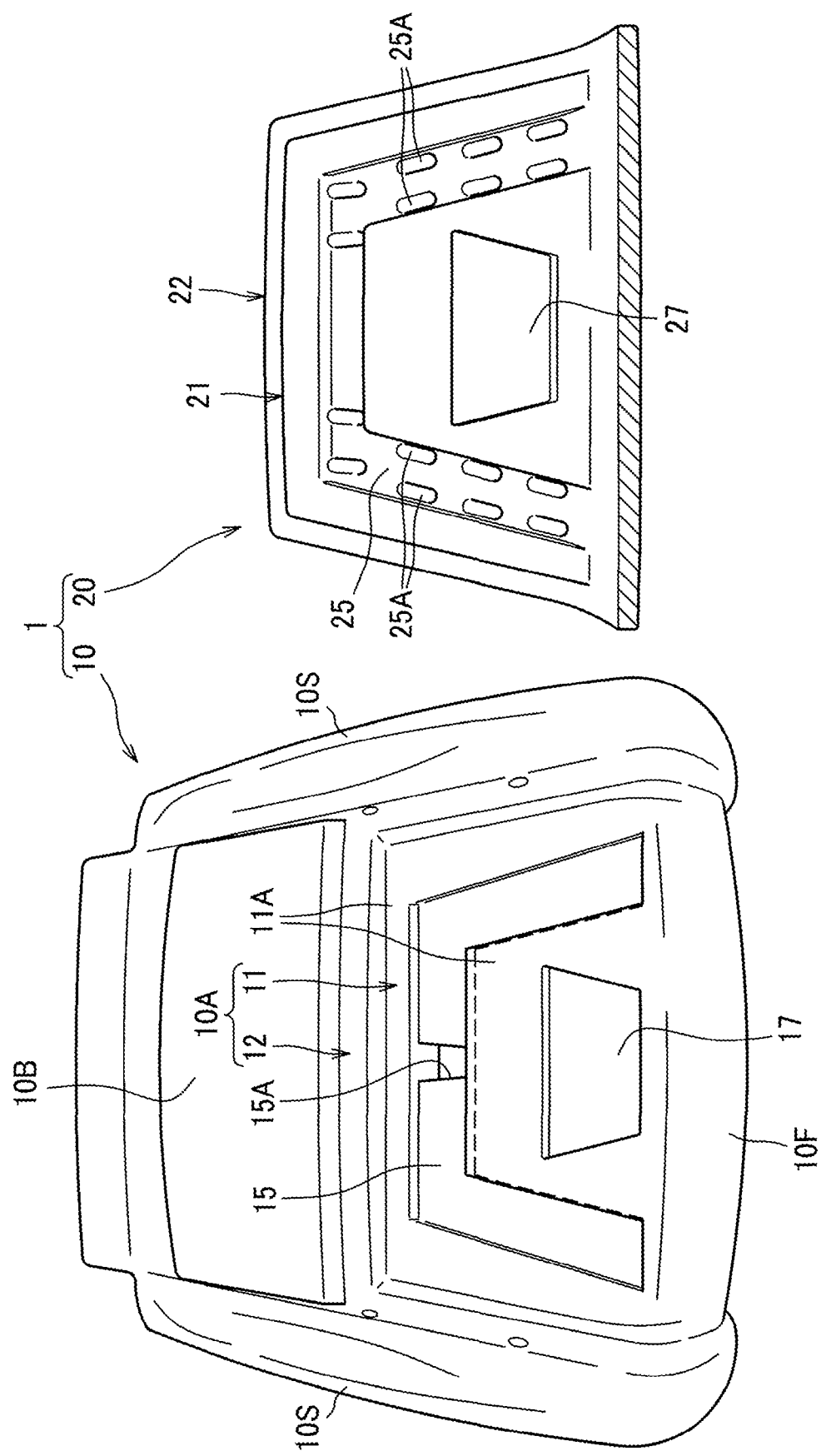
FIG. 9 is a cutaway perspective view of a pad body, and a cover member as seen from below, according to a modified example.
Figure 10:
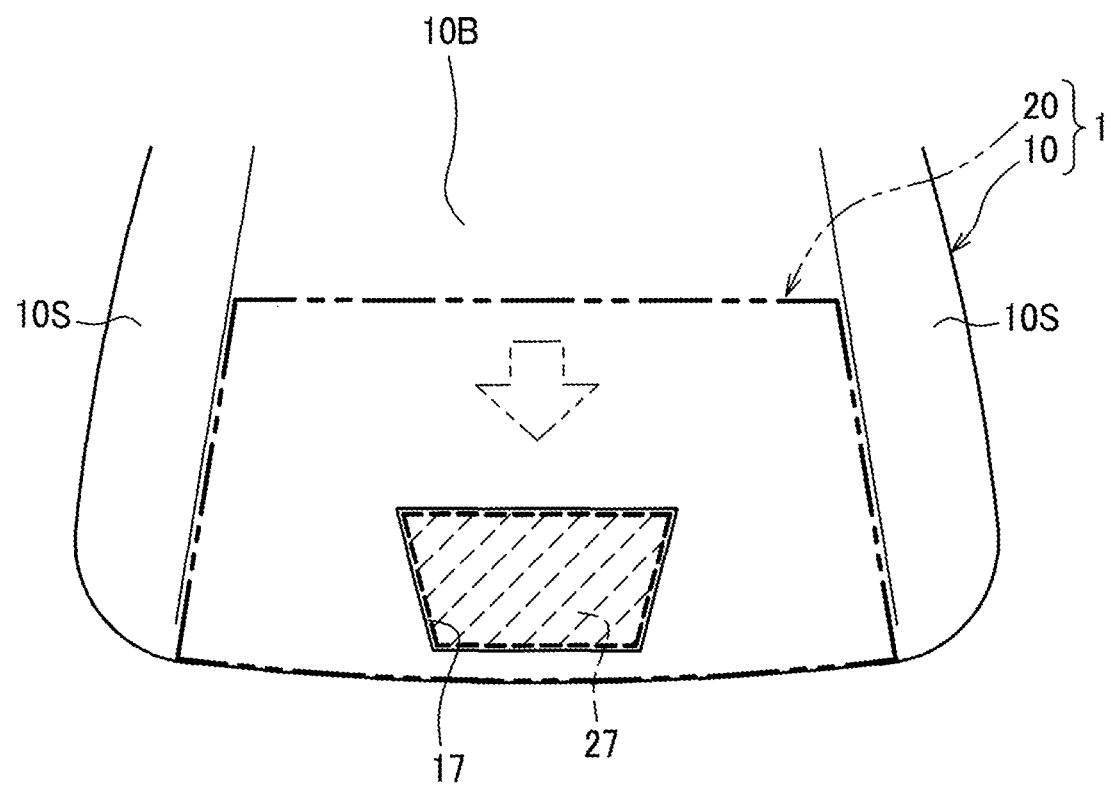
FIG. 10 is a diagram illustrating an operation and an advantageous effect of a locating protrusion and a locating depression of the car seat according to the modified example.

In the above-described embodiment, the locating protrusion 16 is formed on the upper surface of the pad body 10 and the locating depression 26 is formed on the lower surface of the cover member 20, but the present invention is not limited to this configuration. For example, as shown in FIG. 9, a locating depression 17 may be formed on the upper surface of the pad body 10 while a locating protrusion 27 may be formed on the lower surface of the cover member 20. In this configuration, they may preferably be formed such that the lateral widths of the locating depression 17 and the locating protrusion 27 are greater on rear sides thereof than on front sides thereof, as opposed to the above-described embodiment. With this configuration, as shown in FIG. 10, the left and right side surfaces engage when the locating protrusion 27 is fitted in the locating depression 17, so that an undesirable frontward shift of the cover member 20 relative to the pad body 10 can be suppressed effectively.

The above-described embodiment or the alternative configuration shown in FIG. 9 is illustrated such that the locating protrusion 16, 27 and the locating depression 26, 17 are provided with the left and right side surfaces each configured as a substantially flat inclined surface, but the present invention is not limited thereto; for example, they may be each configured as a stepped surface having at least one step. The above-described embodiment or the alternative configuration shown in FIG. 9 is illustrated such that a pair of the locating protrusion 16, 27 and the locating depression 26, 17 is formed in the laterally central portion of the front region of the seat cushion pad 1, but the present invention is not limited thereto. For example, the locating protrusion and the locating depression may be formed in a portion other than the laterally central portion of the front region of the seat cushion pad 1, and/or two or more pairs thereof may be provided.

The above-described embodiment is illustrated such that the extensional marginal portion 22 is configured to extend from each side of the periphery of the cover body 21 so as to surround the cover body 21, but the present invention is not limited thereto. For example, the extensional marginal portion may be configured to extend only from the left and right sides of the periphery of the cover body, or may be configured to extend only from the front side of the periphery of the cover body.

The above-described embodiment is illustrated such that the air-passage depressions 15, 25 are provided in the both of the pad body 10 and the cover member 20 to define the air passage 1A, but the present invention is not limited thereto. For example, the air-passage depression may be formed only in the pad body, or may be formed only in the cover member.

Figure 11:
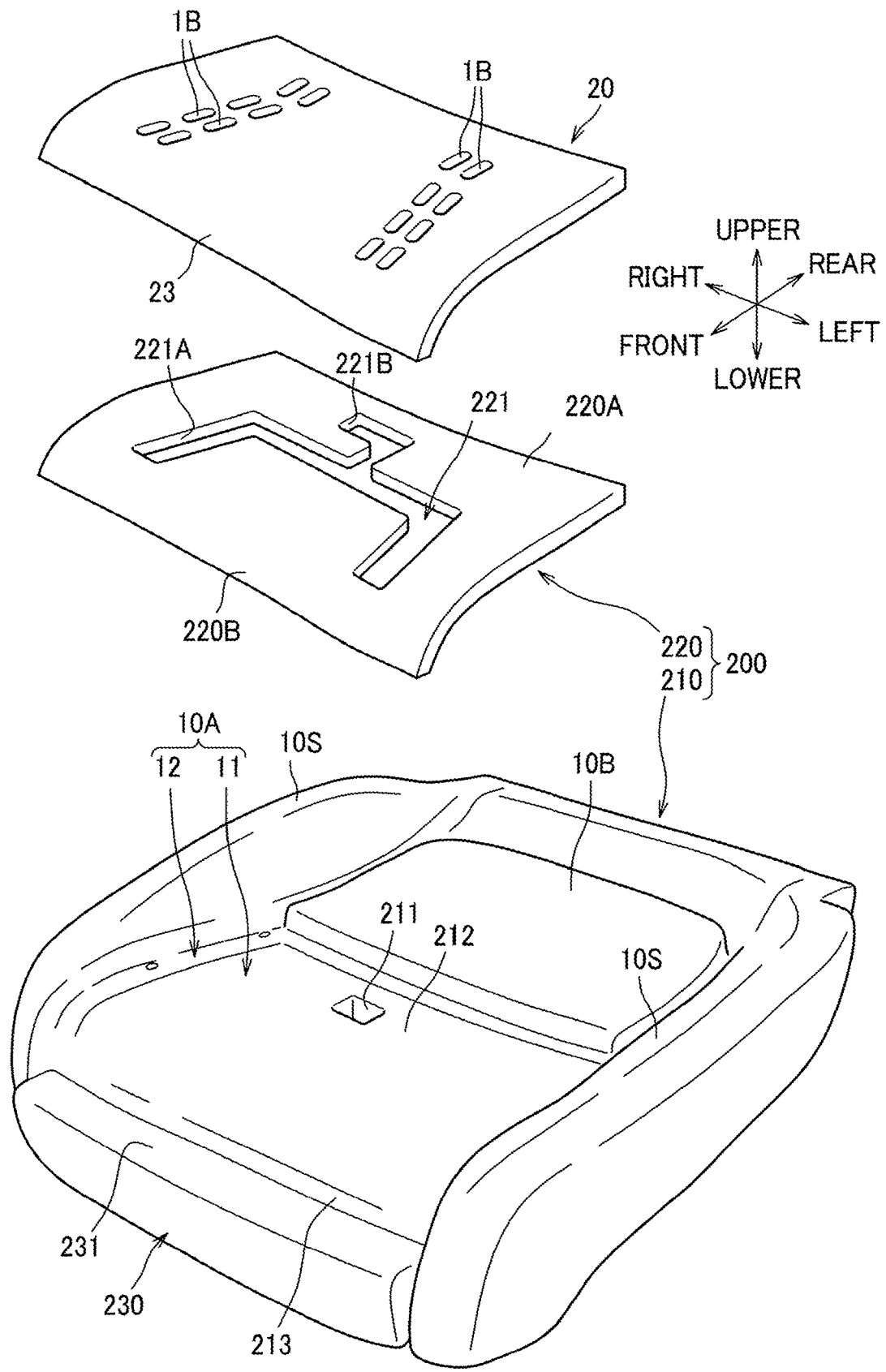
FIG. 11 is an exploded perspective view of a seat cushion pad according to a second modified example.

The above-described embodiment is illustrated such that the pad body 10 is configured as one part, but the practicable configuration of the pad body may not be limited thereto. For example, as shown in FIG. 11, a pad body 200 may be configured to comprise two parts, i.e., a first body portion 210, and a second body portion 220 disposed between the first body portion 210 and the cover member 20.

To be more specific, the first body portion 210 is configured, similar to the pad body 10 illustrated in the above-described embodiment, to include an engageable depression 10A (having a first depression 11), a central rear portion 10B, and a bulging portion 10S. The first body portion 10A has a through hole 211 formed in a rear portion of the first depression 11, which through hole 211 pierces in the upward-downward direction. A bottom surface 212 of the first depression 11 has no unevenness but the through hole 211, and is formed as a substantially flat surface.

The first body portion 210 includes, at a front end portion thereof, a front-side stepped portion 213, as an example of a stepped portion that is lower in level on a front side thereof. To be more specific, the first body portion 210 includes a protruding portion 230 protruding frontward at a lower portion of the front end portion. The protruding portion 230 is provided over a range extending from the left end to the right end of the first body portion 210. This protruding portion 230 has a contact surface 231 facing upward provided in a position lower than that of the bottom surface 212 of the first depression 11. A portion of the first body portion 210 between the bottom surface 212 of the first depression 11 and the contact surface 231 provides a difference in level which forms the front-side stepped portion 213.

The second body portion 220 includes a rectangular air-passage forming portion 220A and a front end portion 220B, the air-passage forming portion 220A being laid over the upper surface of the first body portion 210, specifically, on the bottom surface 212 of the first depression 11, and the front end portion 220B being configured to extend from the air-passage forming portion 220A in a frontward-and-downward direction. This second body portion 220 may be made of a material that is the same as, or different from, the material for the first body portion 210 or the cover member 20.

The air-passage forming portion 220A has an air vent slot 221 piercing in the upward-downward direction. This air-passage forming portion 220A is disposed over the first depression 11, to thereby form the body-side air-passage depression 15 with the air vent slot 221 and the bottom surface 212 of the first depression 11, as shown in FIG. 12.

Turning back to FIG. 11, the air vent slot 221 includes a first air vent slot 221A formed to have a substantially U shape in a plan view, and a second air vent slot 221B extending from a position overlapping the through hole 211, of the second body portion 220 and connecting to the first air vent slot 221A.

Figure 13:
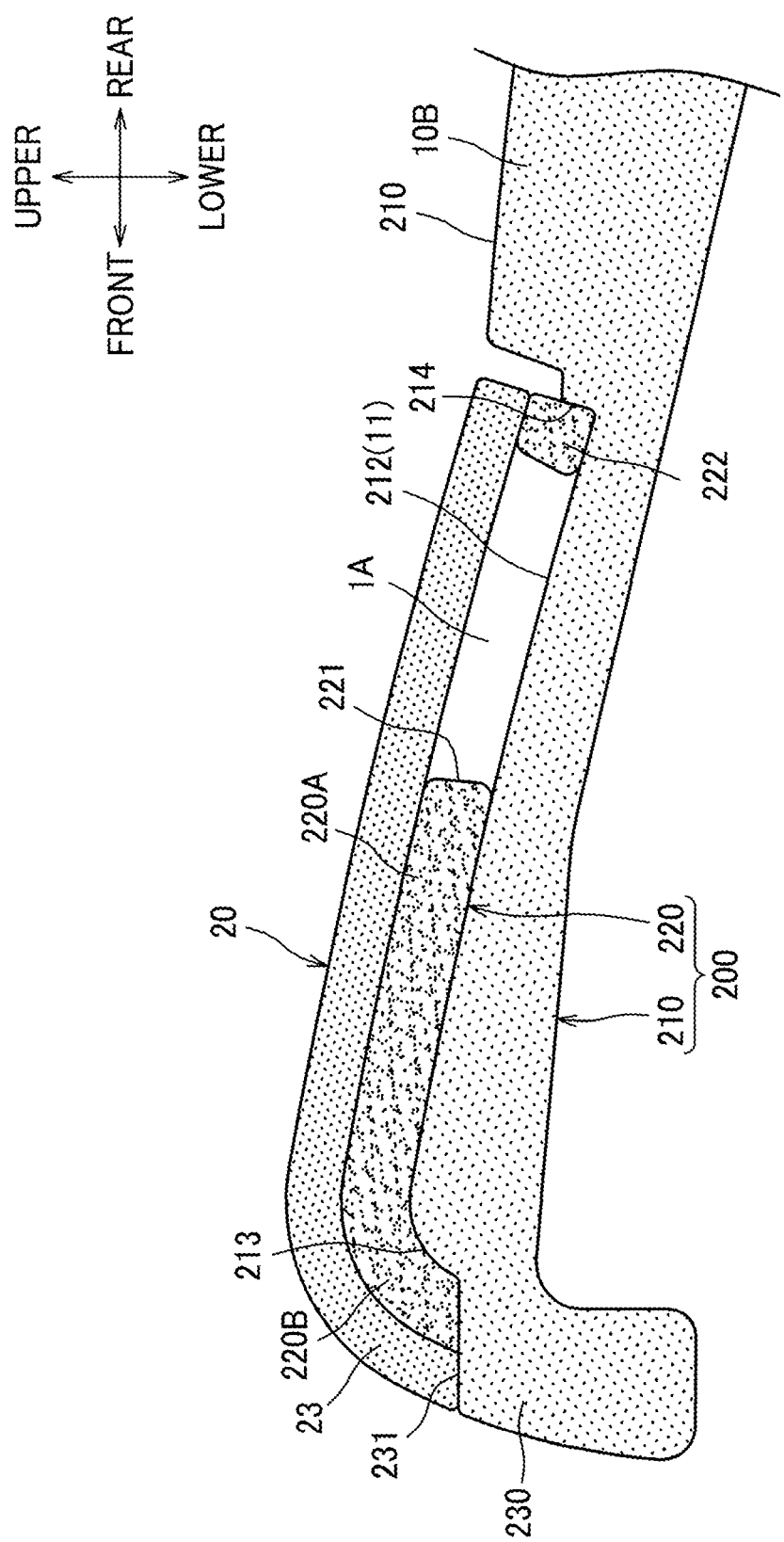
FIG. 13 is a sectional view of the seat cushion pad according to the second modified example, taken along a vertical plane extending in a front-rear direction.

As shown in FIG. 13, the front end portion 220B of the second body portion 220 is provided to cover a part of the front-side stepped portion 213 of the first body portion 210, and a lower end of the front end portion 220B is in contact with the contact surface 231 of the protruding portion 230. Moreover, a rear end portion (rear end portion 222 of the air-passage forming portion 220A) of the second body portion 220 is in contact with a rear-side stepped portion 214 that is a stepped portion formed between the first depression 11 and the central rear portion 10B of the first body portion 210.

Figure 12:
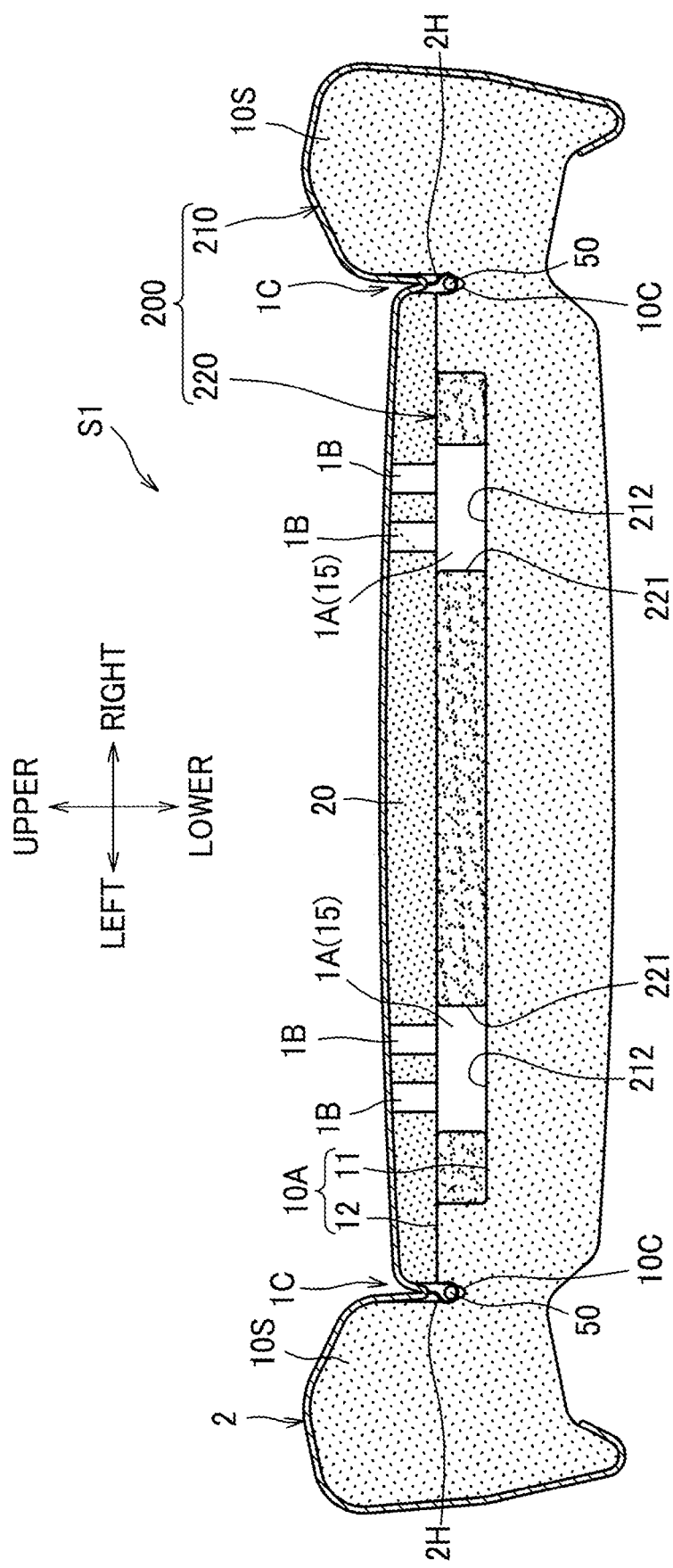
FIG. 12 is a sectional view of the seat cushion pad according to the second modified example, taken along a vertical plane extending in a lateral (left-right) direction.

As shown in FIG. 12, the cover member 20 is different from that of the above-described embodiment in that the cover member 20 is shaped like a substantially flat plate with its lower surface having no cover-side air-passage depression. The lower surface of this cover member 20 in combination with the body-side air-passage depression 15 forms the air passage 1A. The cover member 20 has a plurality of air vents 1B disposed in positions overlapping the body-side air-passage depression 15. It is to be understood that the cover member 20 may have a cover-side air-passage depression provided at its lower surface, as in the above-described embodiment.

As shown in FIG. 13, the front end portion 23 of the cover member 20 is laid over the front end portion 220B of the second body portion 220, and the lower end of the front end portion 23 is in contact with the contact surface 231 of the first body portion 210.

As described above, by providing the second body portion 220 which forms the air passage 1A between the first body portion 210 and the cover member 20, deformation of the air passage 1A which would appear when an occupant sits down on the car seat S can be suppressed more effectively in comparison with the case where the air passage 1A is formed by the body-side air-passage depression 15 of the pad body 10 and the cover-side air-passage depression 25 of the cover member 20 as in the above-described embodiment.

Since the front end portion 220B of the second body portion 220 is configured to extend downward, no unevenness is made at the front portion of the upper surface of the pad body 10 even if the front end portion 220B of the second body portion 220 is lifted when an occupant sits on the seat, with the result that the potential deterioration of the seating comfort can be suppressed.

Since the front end portion 220B of the second body portion 220 is in contact with the contact surface 231 of the protruding portion 230, any undesirable downward shift of the second body 220 can be effectively reduced. Moreover, since the front end portion 220B of the second body portion 220 is in contact with the front-side stepped portion 213 while the rear end portion of the second body portion 220 (the rear end portion 222 of the air-passage forming portion 220A) is in contact with the rear-side stepped portion 214, any undesirable rearward shift of the second body portion 220 can be effectively reduced.

Furthermore, since, in this modified example, the front end portion 23 of the cover member 20 is in contact with the contact surface 231 of the protruding portion 230, the undesirable downward shift of the cover member 20 can be effectively reduced.

Although, in this modified example, the both of the front end portion 220B of the second body portion 220 and the front end portion 23 of the cover member 20 are in contact with the contact surface 231 of the protruding portion 230, an alternative configuration may be feasible in which only one of the front end portion 220B of the second body portion 220 and the front end portion 23 of the cover member 20 is in contact with the contact surface 231 of the protruding portion 230.

The above-described embodiments are illustrated as examples in which the present invention is applied to a seat for use in an automobile (i.e., car seat S), but the present invention is not limited thereto, but is also applicable to any other vehicles, such as rail cars, ships and aircrafts, etc. Furthermore, the present invention is not limited to a vehicle seat, but is also applicable to any seat for use in public facilities (e.g., movie theaters) or at home, for example.

The invention claimed is:

1. A seat comprising:
 a seat cushion pad having an air passage formed inside; and
 an air vent formed at an upper surface of the air passage, wherein the seat is configured to allow air to flow through the air passage and the air vent,
 wherein the seat cushion pad comprises:
  a pad body, and
  a cover member, wherein
  the cover member is disposed over the pad body to form the air passage between the pad body and the cover member, the air vent being formed in the cover member,
 wherein the pad body comprises:
 a first body portion, and
 a second body portion, wherein
  the second body portion is disposed between the first body portion and the cover member, and
  the second body portion is laid over an upper surface of the first body portion, and
 wherein the cover member includes a front end portion extending downward over a front end portion of the second body portion.

2. The seat according to claim 1, wherein the first body portion comprises:
 a front-side stepped portion located at a front end portion of the first body portion,
  wherein the upper surface of the first body portion includes a first upward-facing surface portion disposed rearward of the front-side stepped portion and a second upward-facing surface portion disposed frontward of the front-side stepped portion and lower in level than the first upward-facing surface portion, and wherein the front end portion of the cover member is in contact with the second upward-facing surface portion.

3. The seat according to claim 2, wherein the front-side stepped portion extends from a right end of the first body portion to a left end thereof.

4. The seat according to claim 1, wherein the first body portion includes an engageable depression located in a front region of a laterally central portion of an upper surface of the first body portion,
wherein the engageable depression has a shape recessed down with respect to a rear region of the laterally central portion of the upper surface of the first body portion.

5. The seat according to claim 4, wherein the engageable depression includes a first depression in which the second body portion is engageable.

6. The seat according to claim 5, wherein the first body portion comprises:
a rear-side stepped portion that is a stepped portion formed between a bottom of the first depression and the rear region of the laterally central portion, and
wherein a rear end portion of the second body portion is in contact with the rear-side stepped portion of the first body portion.

7. The seat according to claim 5, wherein the engageable depression further includes a second depression that is recessed down to a level that is one step higher than a level of a bottom of the first depression, and the second depression is formed around the first depression.

8. The seat according to claim 7, wherein the cover member is engageable in the second depression.

9. The seat according to claim 1, wherein the front end portion of the second body portion includes an upper surface curving downward.

10. The seat according to claim 1, wherein the cover member is thinner than the second body portion.

11. A method for making a seat with a seat cushion pad having an air passage formed inside and an air vent formed at an upper surface thereof, the seat being configured to allow air to flow through the air passage and the air vent, the method comprising:
providing a first body portion;
providing a second body portion over an upper surface of the first body portion to form a pad body of the seat cushion pad, the second body portion including a front end portion; and
providing a cover member having the air vent formed therein and including a front end portion, over the pad body, to form the air passage in the second body portion located between the first body portion and the cover member, such that the front end portion of the cover member extends downward over a front end portion of the second body portion.

* * * * *